(No Model.)

G. D. THOMPSON.
ATTACHMENT FOR PHOTOGRAPHIC CAMERAS.

No. 401,802. Patented Apr. 23, 1889.

Witnesses.
Frank L. Millward
H. D. Murray

Inventor,
George D. Thompson.
By his Attorney Geo. D. Murray

UNITED STATES PATENT OFFICE.

GEORGE D. THOMPSON, OF LOCKLAND, OHIO.

ATTACHMENT FOR PHOTOGRAPHIC CAMERAS.

SPECIFICATION forming part of Letters Patent No. 401,802, dated April 23, 1889.

Application filed June 11, 1888. Serial No. 276,742. (No model.)

*To all whom it may concern:*

Be it known that I, GEORGE D. THOMPSON, a citizen of the United States, and a resident of Lockland, in the county of Hamilton and State of Ohio, have invented certain new and useful Improvements in Attachments for Photographic Cameras, of which the following is a specification.

My invention is an improved attachment for photographic cameras, and is particularly designed for use with what are known as "detective-cameras." Its object is to provide a plate-receptacle for cameras or dark boxes for holding a number of sensitized plates in such position that they may be successively exposed to receive an impression and discharged into a dark receptacle so soon as the impression is made, the act of discharging one plate throwing the one back of it into position for the next operation. Its object is also to shield the plates, that they may not be liable to be broken, or injured by rubbing together or by light passing through one plate to the others back or under it.

The invention will be first fully described in connection with the accompanying drawings, and will then be particularly referred to and pointed out in the claims.

Figure 1:
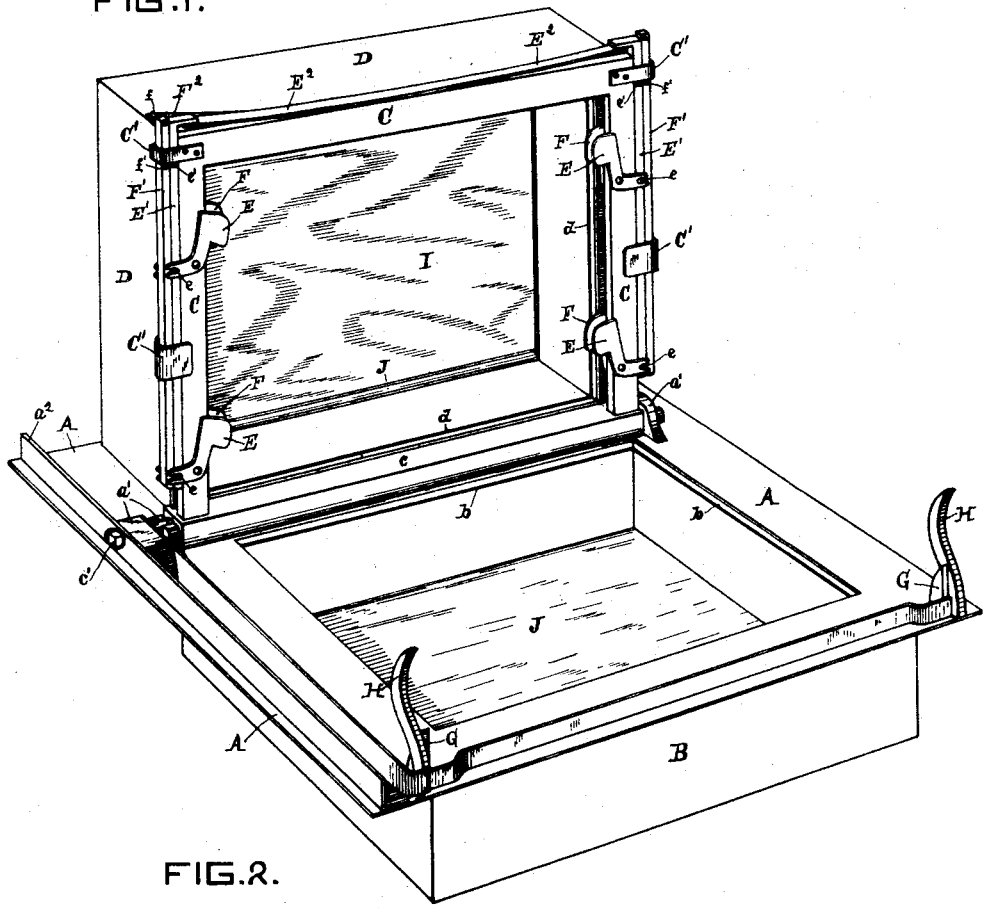
Figure 2:
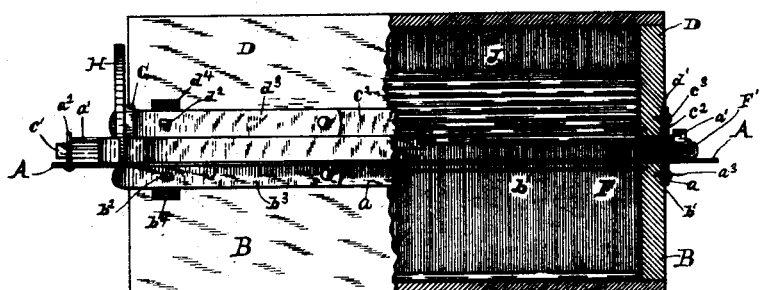
Figure 3:

Referring to the drawings, in which like parts are indicated by similar reference-letters wherever they occur throughout the various views, Figure 1 is a perspective view of my improved attachment, the upper plate-receptacle being in the position it occupies while the plate is exposed; but the front plate in this view is removed in order to expose both sets of plate-holding latches. Fig. 2 is a view, partly in front elevation and partly in transverse vertical section, of the attachment, the upper box or receptacle being closed down and the plates in the positions they will then occupy. Fig. 3 is an end elevation of the incased plate upon a larger scale.

Referring to the parts, A is a light metal frame, which has a downwardly-projecting flange, $a$, extending around three sides of it, to receive and hold the lower plate-receptacle, B. Upon top of the frame A is hinged another light metal frame, C, the hinged edge of this frame being the bar or shaft $c$, which has its ends journaled in bearings $a'$, which project up from frame A. One end, $c'$, of the shaft is angular to receive a key by which the frame C is turned from the position shown in Fig. 1 to that shown in Fig. 2, and vice versa.

The frame C has an upwardly-projecting angle-frame, $c^2$, secured upon it, the upwardly-projecting flange of which extends around three of its sides to receive the upper box or receptacle, D. Upon each end of the frame C are pivoted spring-actuated latches E and F, for retaining the plates in the upper receptacle, holding the forward or outer plate in position to receive the impression, and after the impression is made dropping it into the lower receptacle and receiving the next one in its place.

The latches E are pivoted to the outer faces of the frame ends C, while latches F, which are the same in construction and operated in the same manner, are pivoted upon the opposite or inner faces, a space being left between the frame C and the angle-frame $c^2$ to allow them to move freely. The plate-engaging ends of the latches E and F are, when the frame C, with its attachments, is in the position shown in Fig. 1, held to project over the inner edges of the frame C by the spring-pressed rods E' F', which are arranged to slide in U-shaped guides C', which embrace the frame C. The rods E' have pins $e$ projecting from them into notches in the angle-arms of the latches E, and the rods F' have similar pins projecting from them upon the opposite sides to enter similar notches in the arms of latches F. The rods E' are held up by a curved spring, E², which is centrally secured to the flange $c^2$, and has its ends pressing underneath the inwardly-bent ends of the rods E'. The rods F' are similarly acted upon by a similar spring, F², its ends pressing against pins $f$, which pass through the upper ends of the rods F' and over the end of the spring. The rods are stopped from moving too far by pins $e'$ $f'$ striking the guides C'.

When the frame C is turned up, as in Fig. 1, the forward plate is between the two sets of latches E and F. So soon as the impression is taken the frame C is turned down by a key upon the end $c'$ of the shaft, and when nearly closed the angular ends of the rods E' strike the cam projections G, which project up from frame A, the rods being forced back, turning the latches E back of the inner edges of the frame, as seen in Fig. 2, allowing the plate to drop face downward into the lower receptacle, B. When the frame C is again raised, the latches E are again thrown inward by their spring-rods, and immediately thereafter the ends of the rods F' strike the curved projections H. The latches F are thrown back, allowing another plate to take the place of the one just discharged into the lower receptacle. The latches F, when released by the further upper movement of the frame C, enter between the forward plate and the next one. Thus with instantaneous plates impressions may be taken as rapidly as the hinged member can be turned up and back, and when the parts are closed, as light is completely excluded, they may be preserved for future development.

Around the inside of the receptacles are grooves $d$ $b$, which are cut entirely through one end of the receptacles to receive the customary hard-rubber or other dark slides which are to close the receptacles when they are to be changed. In practice I have a number of these receptacles filled with fresh plates. After all the plates in the upper receptacle are exhausted, the slide is pushed in over the under receptacle, which is then removed. I then remove the upper empty receptacle, place it underneath the frame A, and place a receptacle filled with fresh plates on frame C.

The receptacles B and D being made interchangeable, I am enabled when going on a trip to provide myself with any number of prepared plates fully protected from light, and after they have received the impressions to preserve them in the receptacles until necessary to develop them. It should be understood that the upper receptacle, filled with fresh plates, should be replaced while the frames A and C are in the closed position, and the slide then drawn out, leaving the plates resting upon the inner latches, F. So soon as the frame C is elevated the cams H, acting upon the latches through their spring-pressed rods, will drop the first plate in position to be acted upon between the latches E and F.

The ends of the frame A which project beyond the receptacle, in connection with the rib $a^2$, serve to support the attachment upon side guides upon the inside of the camera or dark box.

In the end walls of the flanges $a$ and $c^2$ are pins $a^3$ and $c^3$, which enter holes in plates $b'$ and $d'$, secured to the ends of the receptacles B D. Upon the sides of the receptacles are similar plates, $b^4$ $d^4$, which receive pins $b^2$ $d^2$, carried by springs $b^3$ $d^3$, and retain the receptacles in place. When it is desired to remove either of these boxes, its spring, either $d^3$ or $b^3$, is pressed out to release the pin and the box drawn out endwise. A side door or doors may be made in the camera or dark box for this purpose, and through this door or an opening in the side of the box a hole is made for the insertion of a key by which the upper receptacle is opened and closed.

To protect the plates I from breaking when dropped from the upper to the lower receptacle, injury from rubbing together, and to obstruct the light from passing through one plate and affecting the one next to it during exposure, as well as to insure the latches F catching properly between the plates, I have provided a plate-shield, J, of some opaque material, preferably sheet metal. Two edges of this plate, upon opposite sides, are bent over, as seen in Fig. 3, to retain the plate I, which is slipped into place underneath these lapped-over edges. The other edges of the plate are not turned, and the shields are made long enough to fairly overlap the latches when in the position shown in Fig. 1. Thus different sizes of plates may be used in my attachment, and the plate holders or shields will engage the latches and insure the automatic release of the outer shield and its plate when the box is closed, and the automatic replacement of the next one in position as the upper receptacle is being turned from a horizontal to a vertical position. My shields also admit of the use of sensitized paper, as well as glass plates.

I have shown what I believe to be the best form of embodying my invention; but I do not limit myself to the exact construction shown, for there are many mechanical changes that may be made in its parts without departing from its spirit or scope.

What I claim, and desire to secure by Letters Patent, is—

1. The combination, substantially as specified, of the two frames hinged together, the two receptacles, one secured to each frame, two sets of spring-pressed catches on the upper frame to retain the plates in the upper receptacle, and cam projections upon the lower frame to alternately actuate each set of catches as the upper frame is opened or closed down upon the lower one, whereby the plates are successively released and permitted to drop into the lower receptacle, when the frames are closed and the following plates successively placed in position to receive an impression when the frame is raised.

2. The combination, substantially as specified, of the frame A, the box B, secured underneath said frame, the frame C $c^2$, the box D, secured above said frame, the hinge for uniting the two frames, the pivoted latches E and F upon opposite sides of said frame, the rods E' F', coupled to the latches, the springs $E^2$ and $F^2$, exerting an outward pressure upon said rods, the guides C', for the rods, the cam projections G in the path of said rods E', and the cam projections H in the path of the rods F', for the purpose of automatically releasing the impressed plates as the upper frame is closed and automatically placing a fresh plate in position to be acted upon as the frame is raised.

3. In a camera attachment, the combination of an upper receptacle for the fresh plates and a lower receptacle for the image-impressed plates, the hinge uniting the two receptacles, the hinge-shaft extending out and formed to receive a key, whereby the upper receptacle may be changed from a horizontal to a vertical position without opening the camera or dark box inclosing the receptacles, plate-holders J, to fit the receptacles to protect and shield the plates and hold them separated for the reception of one set of the holder and plate retaining latches, two sets of spring-actuated latches, and cam projections for each set, combined and operating substantially as hereinbefore set forth.

4. The combination of the hinged frames A C, having hinged flanges $a\,c^2$, provided with pins $a^3\,c^3$, and spring-latches $b^3\,b^3\,d^3\,d^3$, with the receptacles B D, provided with perforated plates $b'\,b'$ and $d'\,d'$, whereby the receptacles are detachably connected to their respective frames, substantially as shown and described.

GEORGE D. THOMPSON.

Witnesses:
M. L. MURRAY,
GEO. J. MURRAY.